(12) United States Patent
Ossman et al.

(10) Patent No.: US 8,075,084 B2
(45) Date of Patent: Dec. 13, 2011

(54) SYSTEMS AND METHODS FOR INCREASING OR OPTIMIZING THE OPTICAL CONTRAST RESPONSE OF MULTIPLE COLORS

(75) Inventors: Kenneth Russell Ossman, Macedon, NY (US); R. Enrique Viturro, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 708 days.

(21) Appl. No.: 12/170,533

(22) Filed: Jul. 10, 2008

(65) Prior Publication Data

US 2010/0007279 A1      Jan. 14, 2010

(51) Int. Cl.
*G01D 15/14* (2006.01)
*B41J 29/70* (2006.01)
(52) U.S. Cl. .......................... 347/19; 347/232
(58) Field of Classification Search .................. 315/224, 315/291, 307, 312; 347/224, 230, 232, 236, 347/237–239, 246, 247
See application file for complete search history.

(56) References Cited

U.S. PATENT DOCUMENTS

| | | | |
|---|---|---|---|
| 6,178,007 B1 * | 1/2001 | Harrington | 358/1.9 |
| 6,975,949 B2 * | 12/2005 | Mestha et al. | 702/76 |
| 7,259,857 B2 * | 8/2007 | Butterfield et al. | 356/444 |
| 7,271,935 B2 * | 9/2007 | Coons et al. | 358/2.1 |
| 7,388,688 B2 * | 6/2008 | Yamazaki et al. | 358/1.9 |

* cited by examiner

*Primary Examiner* — Douglas W Owens
*Assistant Examiner* — Minh D A
(74) *Attorney, Agent, or Firm* — Pillsbury Winthrop Shaw Pittman LLP

(57) ABSTRACT

Methods and systems are provided to increase or optimize the illumination used with a sensor to measure printed ink colors on a substrate at high speed (up to 3 m/s) and high resolution. By modifying the number of light sources, their wavelengths and/or their relative intensities, the optical contrast can be increased or optimized to yield a higher signal-to-noise ratio and improved accuracy for the measurement of multiple colors. In one implementation, multiple LEDs with selected output peak wavelength may be used to achieve higher contrast imaging for each color.

22 Claims, 6 Drawing Sheets

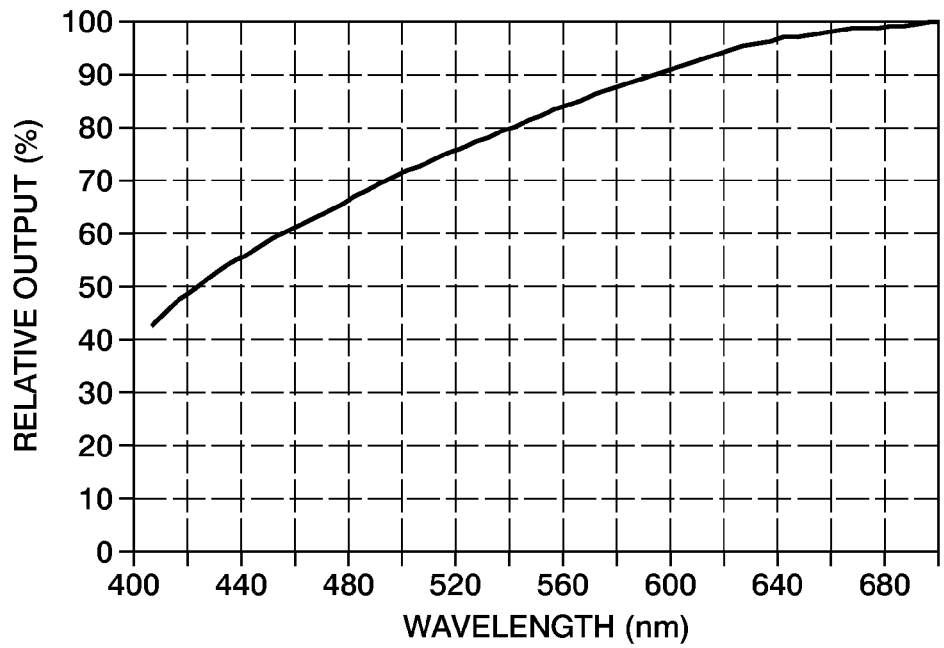
FIG. 3 *(Related Art)*
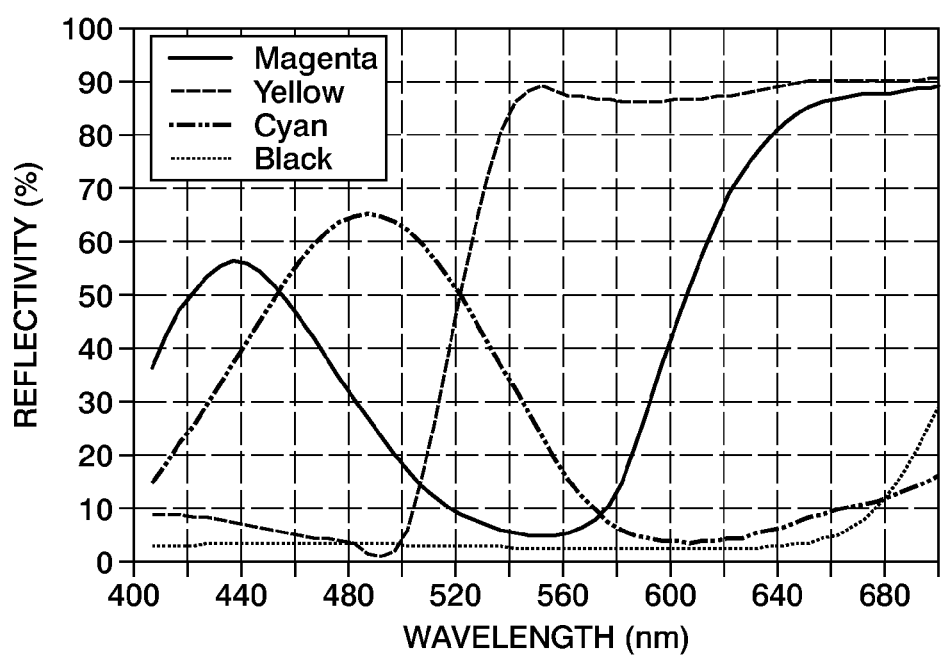
FIG. 4

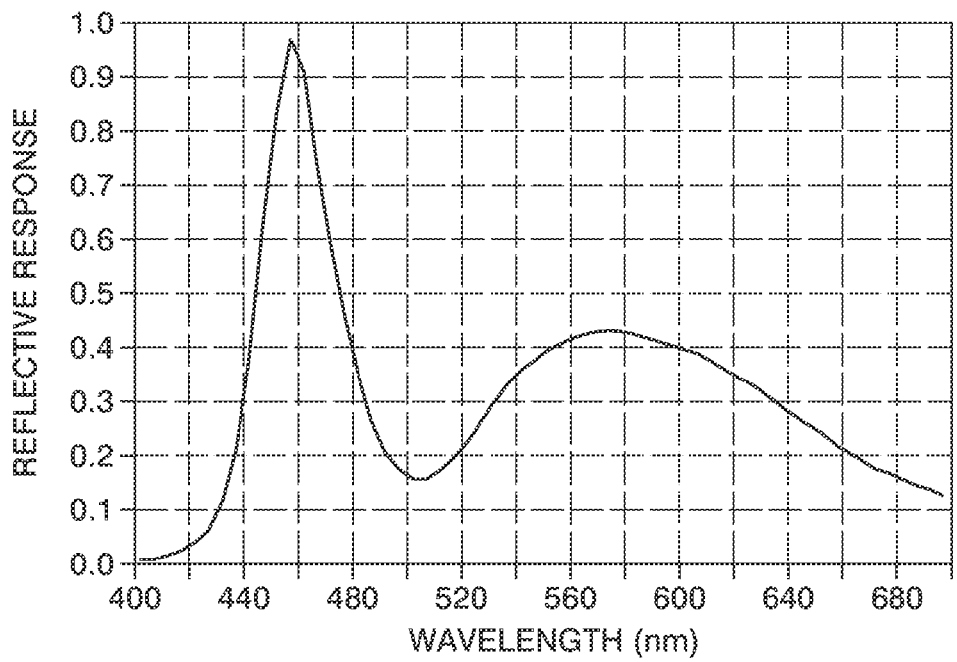
FIG. 9 *(Related Art)*
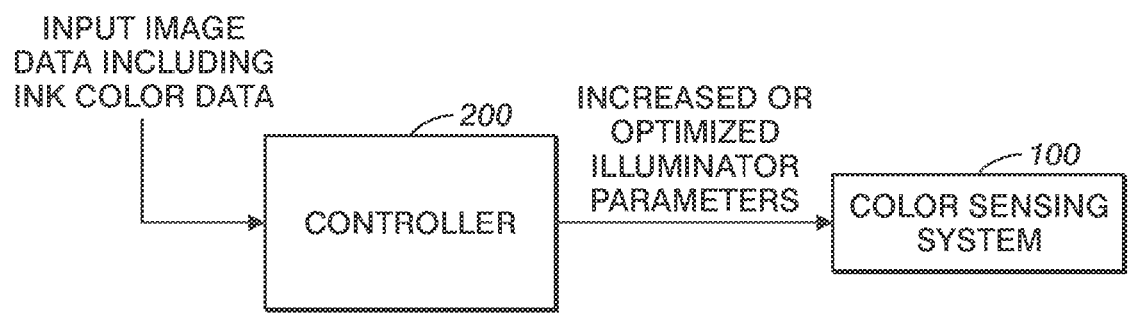
FIG. 10

SYSTEMS AND METHODS FOR INCREASING OR OPTIMIZING THE OPTICAL CONTRAST RESPONSE OF MULTIPLE COLORS

FIELD

This application relates to systems and methods for increasing or optimizing the optical contrast response of multiple colors.

BACKGROUND

FIG. 1 is an elevational view of a direct-to-sheet, continuous-web, phase-change ink printer. Systems of this type were proposed, for example, in U.S. patent application Ser. No. 11/773,549 filed Jul. 5, 2007, and Ser. No. 11/696,954 filed Apr. 5, 2007, herein incorporated by reference in their entirety.

A very long (i.e., substantially continuous) web W of "substrate" (paper, plastic, or other printable material), supplied on a spool 10, is unwound as needed, propelled by a variety of motors, not shown. A set of rolls 12 controls the tension of the unwinding web as the web moves through a path.

Along the path there is provided a preheater 18, which brings the web to an initial predetermined temperature. The preheater 18 can rely on contact, radiant, conductive, or convective heat to bring the web W to a target preheat temperature.

The web W moves through a printing station 20 including a series of printheads 21A (C), 21B (M), 21C (Y), and 21D (K), each printhead effectively extending across the width of the web and being able to place ink of one primary color directly (i.e., without use of an intermediate or offset member) onto the moving web. As is generally familiar, each of the four primary-color images placed on overlapping areas on the web W combine to form a full-color image, based on the image data sent to each printhead through image path 22. It should be understood that the images may be printed on the web W by any ink jet printing process or any printing operation as known to one of ordinary skill in the art.

The ink directed to web W may be a "phase-change ink" (i.e., the ink is substantially solid at room temperature and substantially liquid when initially jetted onto the web W), although, other types of inks may also be used.

Associated with each primary color printhead is a backing member 24A, 24B, 24C, 24D, typically in the form of a bar or roll, which is arranged substantially opposite the printhead on the other side of web W. Each backing member is used to position the web W so that the gap between the printhead and the web W stays at a known, constant distance.

Following the printing zone 20 along the web path is a series of tension rolls 26, followed by an image sensor 28 to detect defects in the one or more images formed on the web W. In embodiments, the image sensor 28 may determine whether the image is accurately printed.

The web W may be moved to a position adjacent to the coating station 29. The coating station 29 may apply or may transfer a coating onto the side(s) of the web W after the printing operation. In some implementations, application of the coating by the coating station 29 to the side(s) of the web W may be identified as a pre-finishing step within a continuous solid ink jet print process. "Pre-finishing step" refers to a step in a print process which may be completed prior to exposing ink on the web W to an ink spreading device or ink spreading procedure.

Following the coating station 29, there are one or more "midheaters" 30. The midheater 30 can use contact, radiant, conductive, and/or convective heat to bring the web W to the target temperature. The midheater 30 brings the ink placed on the web to a temperature suitable for desired properties when the ink on the web is sent through the spreader 40.

Following the midheaters 30, along the path of web W, is a "spreader" 40, that applies a predetermined pressure, and in some implementations, heat, to the web W. The function of the spreader 40 is to take what are essentially isolated droplets of ink on web W and smear them out in a controlled manner to make a continuous layer by pressure, and, in one embodiment, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rolls, such as image-side roll 42 and pressure roll 44, that apply heat and pressure to the web W. Either roll can include heat elements such as 46 to bring the web W to a temperature in a range from about 35° C. to about 80° C.

The spreader 40 can also include a cleaning/oiling station 48 associated with image-side roll 42, suitable for cleaning and/or applying a layer of some lubricant or other material to the roll surface.

Following the spreader 40, the printer in this embodiment includes a "glosser" 50, whose function is to change the gloss of the image (such a glosser can be considered an "option" in a practical implementation). The glosser 50 applies a predetermined combination of temperature and pressure, to obtain a desired amount of gloss on the ink that has just been spread by spreader 40. Additionally, the glosser roll surface may have a texture that the user desires to impress on the ink surface. The glosser 50 includes two rolls (image-side roll 52 and pressure roll 54) forming a nip through which the web W passes.

Following passage through the spreader 40 and glosser 50, the printed web can be imaged on the other side, and then cut into pages, such as for binding (not shown).

The sensor 28, discussed above, may advantageously be a full width array (FWA) sensor 28 provided along the media path to sense and control the registration between the various print heads, color uniformity and/or color consistency of the inks. While a single sensor 28 is shown to be located prior to the midheater 30, it will be readily appreciated that the sensor 28 may be provided at other locations along the media path and/or multiple sensors may be provided.

The resulting two-dimensional image that is imaged by sensor 28 may be used determine the location of the centers of microscopic area of ink drops and how much ink is contained in them (also referred to as intensity or amplitude). These measurements are analyzed, for example, by software, to determine characteristics indicating mislocations of the print heads or any drops that may be missing or are incorrectly sized.

The optical contrast characteristics of the colors with respect to the substrate are critical for accurate sensing of the above features. Currently, a white light source, for example, fluorescent or LED, is utilized as an illuminator with the sensor 28 to provide a wide range of contrast for the various colored inks, with the largest contrast for black ink and the smallest contrast for yellow ink. As with many monochrome imaging systems, though, certain low contrast colored inks, and in particular yellow, make it difficult to obtain accurate measurements.

SUMMARY

According to one aspect of the application, a method for increasing the optical contrast for printed color relative to a background substrate is provided. The method comprises: providing an illuminator comprising at least one light source; determining a color to be printed; and selectively controlling the at least one light source to produce a spectral output that increases the optical contrast of printed color relative to the background substrate when measuring the printed color.

According to another aspect of the application, a system for increasing the optical contrast for printed color relative to a background is provided. The system comprises: an illuminator comprising at least one light source; a color measuring device; and a controller for selectively controlling the at least one light source so as produce a spectral output response that increases the optical contrast of the printed color relative to the background substrate when measured.

According to a further aspect of the application, a method for increasing the contrast for a spectral measurement relative to a background is provided. The method comprises: providing an illuminator comprising at least one light source; and selectively controlling the at least one light source to produce a spectral output that increases the optical contrast of each spectral measurement relative to the background when making the spectral measurement.

Other objects, features, and advantages of one or more embodiments of the present application will seem apparent from the following detailed description, and accompanying drawings, and the appended claims.

BRIEF DESCRIPTION OF THE DRAWINGS

Embodiments of the present application will now be disclosed, by way of example only, with reference to the accompanying schematic drawings in which corresponding reference symbols indicate corresponding parts, in which:

FIG. 3 shows the spectral response of a typical unfiltered photo detector;

FIG. 4 shows the reflectance spectra for cyan, magenta, yellow and black inks;

FIG. 9 shows the spectral output response for a known "white LED;" and

FIG. 10 shows a controller that may be used in conjunction with a color sensing system, according to an embodiment.

DETAILED DESCRIPTION

This application provides a methodology for increasing or optimizing the optical contrast response for multiple colors when using a color sensing device. When sensing multiple colors simultaneously, for example, for color-to-color registration, the illumination may be selectively tuned to provide an increased or optimized contrast response for multiple colors.

More optical contrast between the inks and the background substrate media that the inks are printed will provide for more accurate color measurement information.

Figure 2:
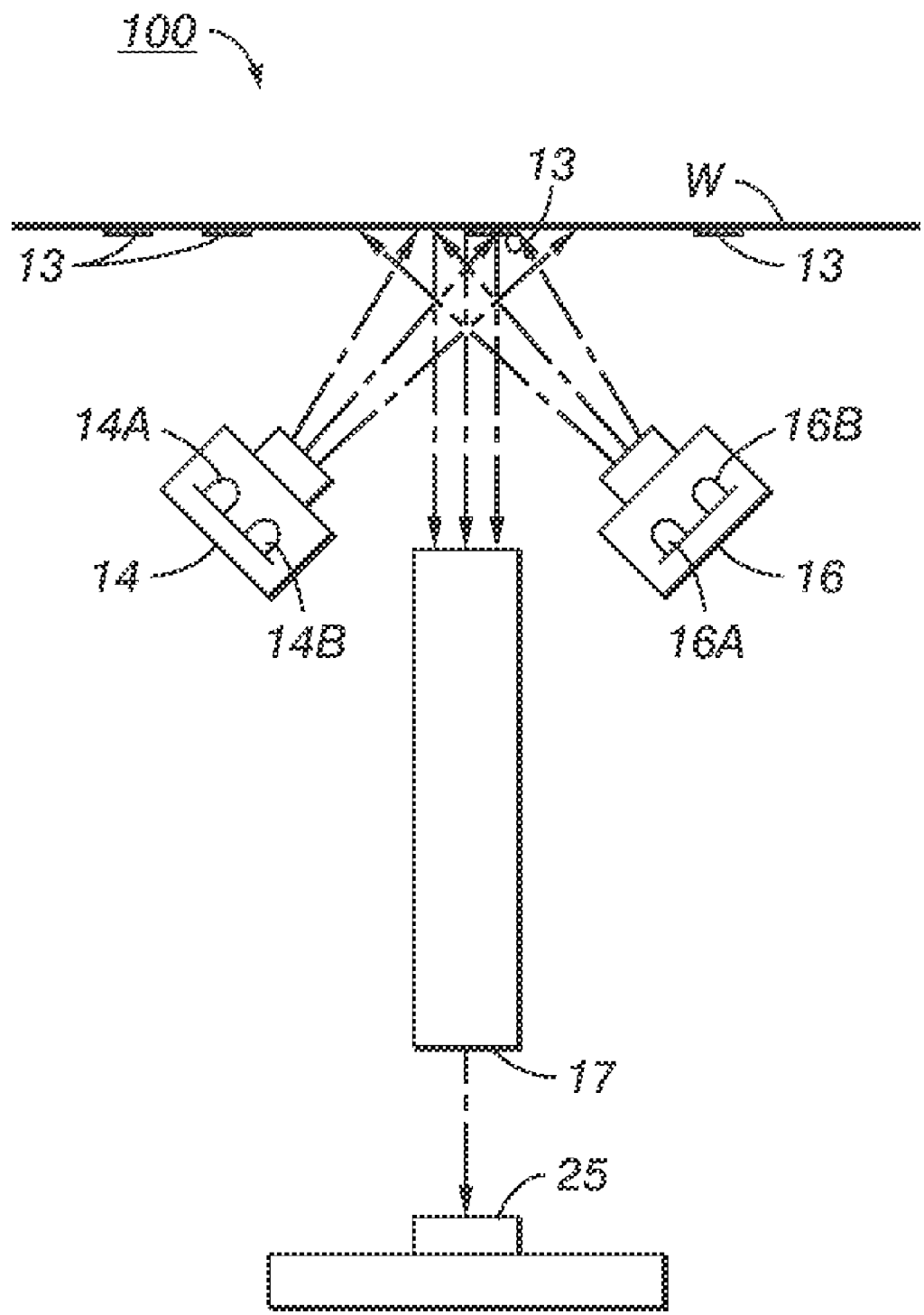
FIG. 2 illustrates an exemplary color sensing system, in accordance with an embodiment.

FIG. 2 illustrates an exemplary color sensing system 100, in accordance with an embodiment. The system 100 may be used to take color measurements, for example, of ink 13 printed on a web W of "substrate." An area $W_A$ of the web W may be illuminated by one or more illuminators 14, 16. Light is reflected from ink 13 and the web W of substrate from the illuminated area $W_A$. A lens 17, such as, for example, a self-focusing SELFOC® lens array from NSG America, Inc., may be used to perpendicularly image the central area of the illuminated area $W_A$ onto color detecting sensor 25. Other geometries may also be utilized.

The output of the color detecting sensor 25 may be normalized (i.e., calibrated) as is generally known in the art when making color measurements. FIG. 3 shows the spectral response of a typical unfiltered photo detector, which may be used as the color detecting sensor 25. The response of the detector steadily increases from about 40% at 400 nm (wavelength) to about 100% at 680 nm. It will be appreciated that any known calibration or normalization process or procedure may be used to calibrate or normalize the color detecting sensor 25.

Figure 1:
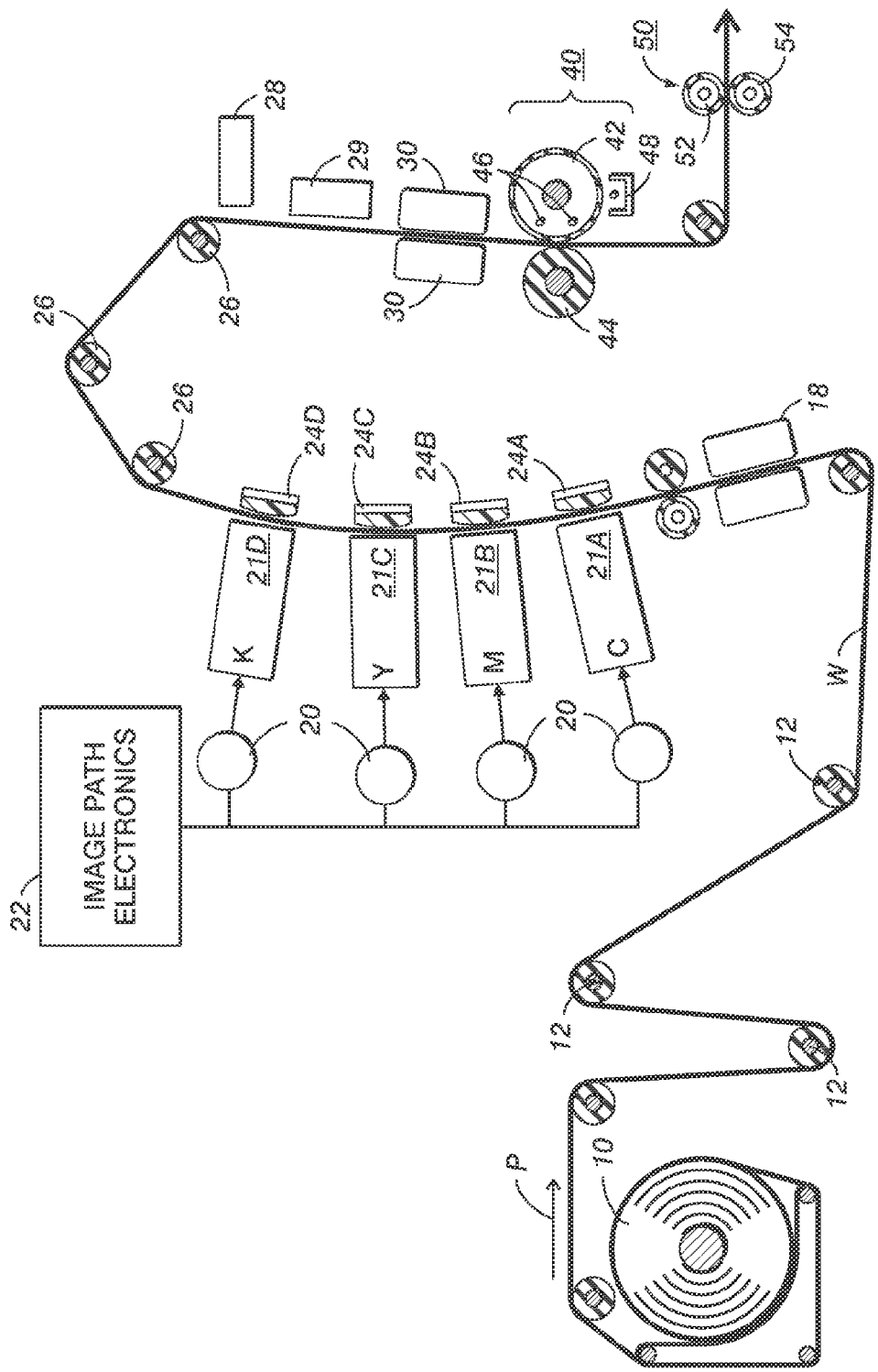
FIG. 1 is an elevational view of a direct-to-sheet, continuous-web, phase-change ink printer.

The color sensing system 100 may be incorporated into an ink printer, for example, as sensor 28 shown in FIG. 1. Although, it will be readily appreciated that the system may be used with other printing technologies, such as ink jet (bubble jet), laser, dot-matrix, solid-ink, dye sublimation, plotters, xerographic, and electrostatic. Depending on the printing technology, in some embodiments, the web W of substrate might also be a photoreceptor belt or image transferring surface within a printing system.

Each of the illuminators 14, 16 may include one or more individual light sources 14A, 14B, 16A, 16B having different spectral output. While only two illuminators are shown in the figure, any number of illuminators may be provided (i.e., three, four, five, etc.). It will be appreciated that the light sources may include one or more of: lamps, bulbs, light emitting diodes (LED), lasers or other light emitting sources. Spectral filters or other means may also be used in some implementations to control the spectral output of the light sources. In some embodiments, only a single illuminator, e.g., 14 having plural light sources 14A, 14B may be used. In other implementations, at least two illuminators 14, 16 may be provided, each including at least one light source.

According to one implementation, the color sensing system 100 may include a full width array (FWA) sensor 25, such as, for example, a FWA scanning spectrophotometer as disclosed in U.S. Pat. No. 6,975,949, herein incorporated by reference in its entirety. The illuminators 14, 16 may comprise multiple colored LEDs, each having different spectra. Each of the light sources may be selectively controlled, for example, at different locations relative to the FWA sensor's width. For example, each of the light sources may be completely switched on or off. The intensity of each of the light sources may also be selectively controlled. The FWA sensor captures an image of a printed target on a substrate in a linear manner as the web travels past it at high speed. The typical target consists of short, fine lines and/or patches of halftones repeated for each of the colors of the inks to be used. The FWA sensor advantageously provides information for the entire width of the substrate media and enables fast response sensing (i.e. speeds up to 3 m/s) at high resolution of control target images.

Other color detecting sensors may be similarly used with the illuminator embodiments disclosed herein, such as, for example, a spectrophotometer, a colorimeter, a densitometer, or spectral camera.

FIG. 4 shows the reflectance spectra for cyan, magenta, yellow and black inks. As readily apparent from the plot, these inks have significantly different reflectance spectra over the visible spectrum, from about 380 to 750 nm (wavelength). For example, yellow ink has a significant increase in reflectivity from about 500 to 540 nm. Magenta ink demonstrates decreased reflectivity after about 440 nm, but the reflectivity does not increase again until having reached a minimum reflectivity at about 560 nm. In addition, cyan ink shows a maximum reflectivity at about 490 nm and black ink shows little to no reflectivity over the entire visible spectrum. Other ink colors (not shown) will demonstrate their own unique spectral responses as well.

The conventional FWA sensor used to measure color, for example, the sensor 28 shown in FIG. 1 uses a fluorescent light source.

Figure 5:
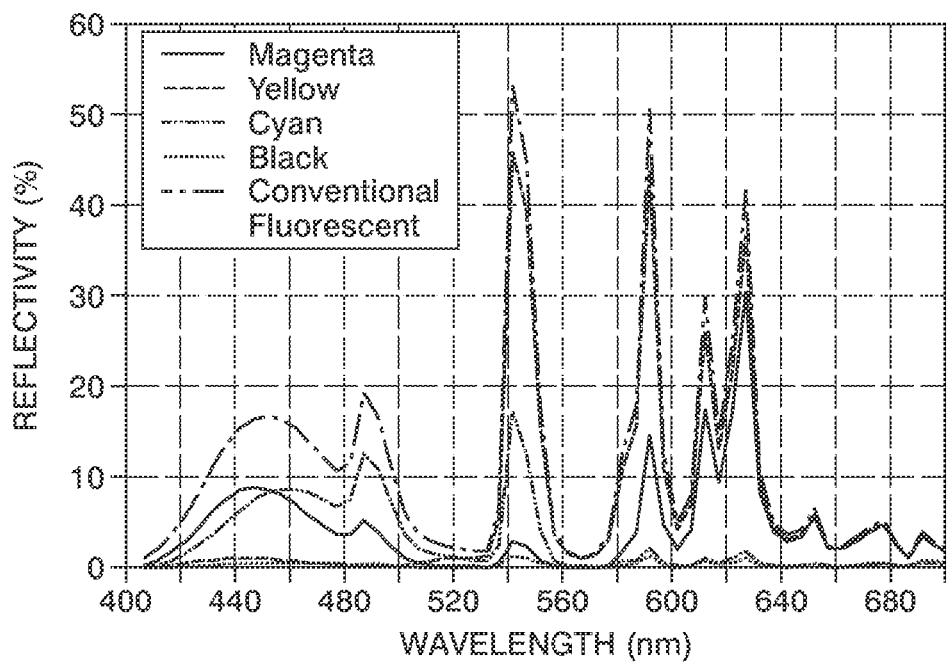
FIG. 5 shows the spectral response of cyan, magenta, yellow, and black inks printed on an ordinary white piece of paper using a conventional fluorescent light source.

FIG. 5 shows the spectral response of cyan, magenta, yellow, and black inks printed on an ordinary white piece of paper using a conventional fluorescent light source as an illuminator. The output spectrum of the fluorescent light source is also shown. At approximately 540 nm, for example the yellow ink demonstrates a high reflectivity, while the cyan and magenta ink reflect to much lesser degrees. However, below about 500 nm, the reflectivity of the yellow ink is approximately zero. A low reflectivity means that a very large portion of the incident light is absorbed by the ink.

One way of characterizing the optical contrast of each ink with respect to the substrate it is printed on is as the difference of sum of the reflectivity over the visible spectrum (i.e., the area under the curve) between the ink and the substrate over the sum of the reflectivity area of the substrate using the same illumination. This may be simplified according to equation (1), as follows:

$$C^C \propto 1 - \frac{\sum R^C(\lambda)}{\sum R^S(\lambda)} \quad (1)$$

where:
$C^C$ is the contrast for each color of ink;
$R^C(\lambda)$ is the normalized sensor response curve for each color of ink as a function of wavelength ($\lambda$); and
$R^S(\lambda)$ is the normalized sensor response curve for the substrate using the same illuminator as a function of wavelength ($\lambda$).

For the CMYK color space, $^C$ will represent each of the four primary ink colors: cyan, magenta, yellow, and black. In other implementations, other ink colors may similarly be used. This contrast model of equation (1) assumes no other reduction of contrast, such as, for example, gloss. However, it will be appreciated that other variables (such as gloss) might also be taken into account when determining contrast.

With each of the inks (corresponding to the spectral response data of FIG. 4) printed on a white piece of paper and illuminated by a conventional fluorescent light source, the relative contrasts for each of the inks printed on a white sheet of paper are shown in TABLE 1.

TABLE 1

| Ink Color | Contrast |
|---|---|
| Cyan | 73% |
| Magenta | 60% |
| Yellow | 42% |
| Black | 97% |

The low contrast for the yellow ink on white paper makes it difficult to obtain accurate measurements for that ink using the conventional fluorescent light source.

The proportion of the incident light reflected by an object versus the portion of light absorbed by an object produces an optical contrast with respect to its background. Thus, if different light sources having different spectral output response are matched to the ink's absorbance then the contrasts can be increased.

According to one aspect of the application, by controlling the spectral output, the number, the intensity, or combinations thereof, of the light sources or illuminators, the optical contrast for multiple colors of ink can be increased or optimized to yield a higher signal-to-noise ratio and improved accuracy for color measurements.

In one implementation, the illuminators 14, 16 may include a plurality of light emitting diodes (LEDs), each having a spectrum with selected output peak wavelengths ($\lambda$) to achieve higher contrast imaging for each color ink. The different colored LEDs may be selectively turned on and off, intensity controlled, or both.

EXAMPLE 1

Figure 6:
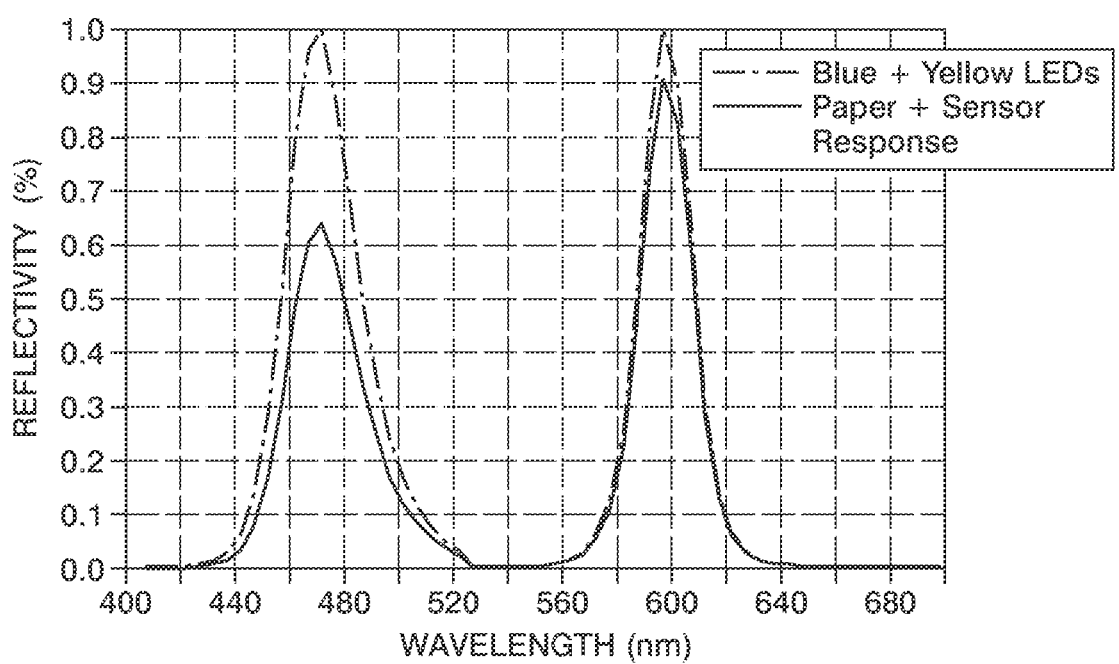
FIG. 6 shows the spectral output of a blue/yellow LED illuminator source and the resulting sensor response to it, in accordance with an embodiment.
Figure 7:
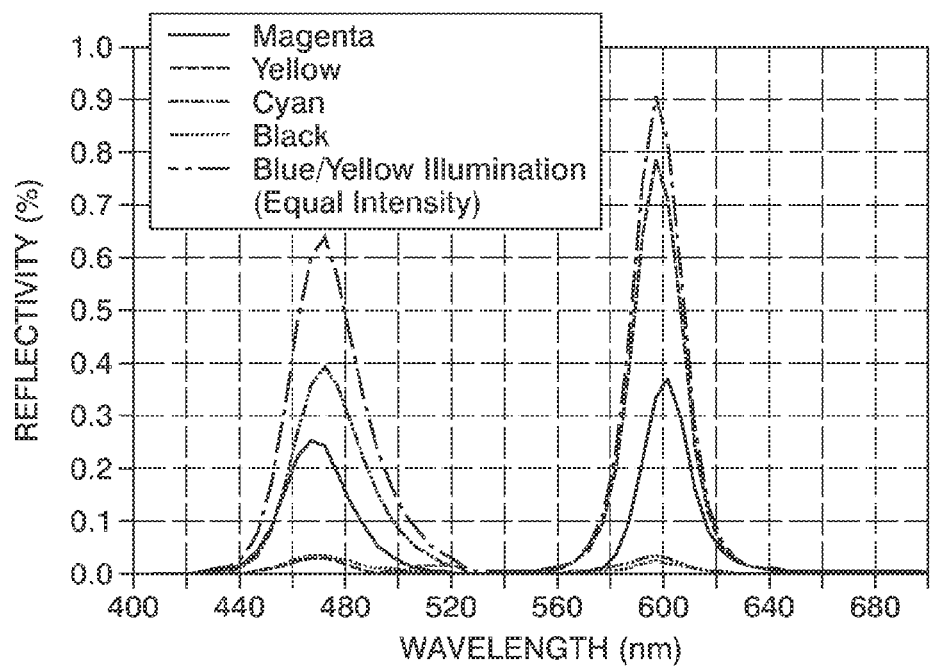
FIG. 7 shows spectral output response for cyan, magenta, yellow, and black inks using the blue/yellow LED illuminator, in accordance with an embodiment.

A blue LED ($\lambda$~470 nm) and a yellow LED ($\lambda$~595 nm) are combined in a single illuminator. FIG. 6 shows the resulting spectral output response of the paper and sensor to the blue/yellow illuminator. FIG. 7 shows the spectral output response for the cyan, magenta, yellow, and black inks using the blue/yellow LED illuminator when the intensity of blue and yellow LEDs are equal.

With each of the inks (corresponding to the spectra response data shown in FIG. 4) printed on a white piece of paper and illuminated by this blue/yellow LED illuminator, the relative contrasts for each of the inks printed on a white sheet of paper are shown in TABLE 2.

TABLE 2

| Ink Color | Contrast |
|---|---|
| Cyan | 68% |
| Magenta | 63% |
| Yellow | 54% |
| Black | 96% |

As will be appreciated, there is a significant improvement for the yellow ink contrast using the two-LED illuminator rather than the conventional fluorescent light source. The blue/yellow illuminator increased the optimal contrast for the yellow ink from 42% to 54%, with only minimal changes with respect to the other inks.

EXAMPLE 2

The contrast of the inks may also be enhanced by changing the intensities of the light sources. The relative intensities of the two-LED illuminator of Example 1 may be modified. For example, the intensity of the longer wavelength LED, i.e., the yellow LED may be lowered to be 65% less intense than the shorter wavelength LED, i.e., the blue LED. The intensity of the illuminator may be controlled, for example, by varying the voltage to the light source using a potentiometer. Alternatively or additionally, a filter or other optical intensity reducing means might be used.

Figure 8:
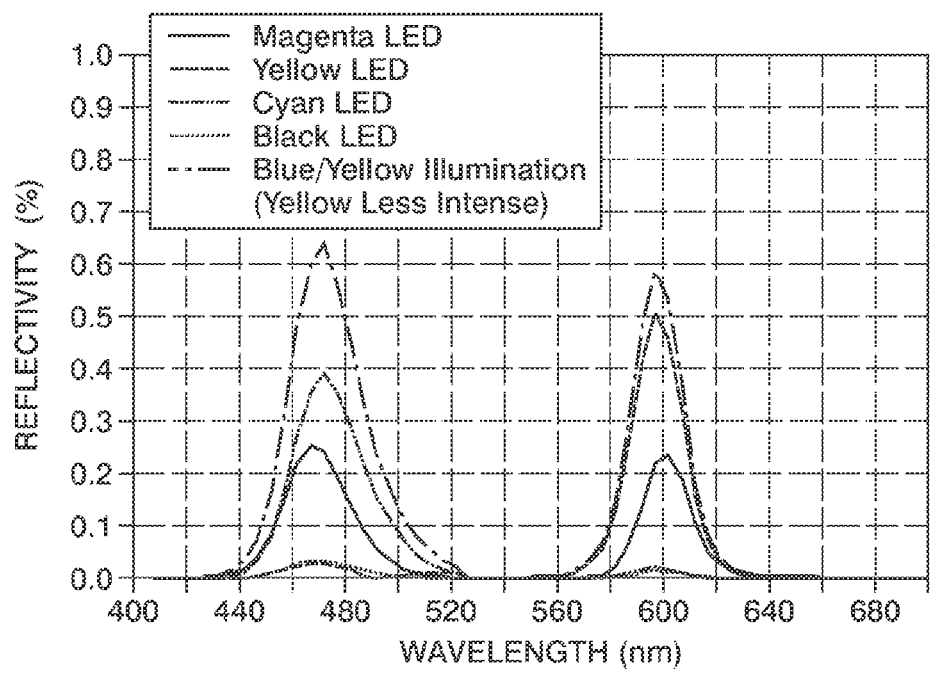
FIG. 8 shows that a change in the intensity of the yellow LED in the blue/yellow LED illuminator produces a new spectral output response for cyan, magenta, yellow, and black inks, in accordance with an embodiment.

FIG. 8 shows that a change in the intensity of the yellow LED in the blue/yellow illuminator produces a new spectral output response for cyan, magenta, yellow, and black inks. The relative contrasts for each of the inks on a piece of white paper using this illuminator are shown in TABLE 3.

TABLE 3

| Ink Color | Contrast |
|---|---|
| Cyan | 62% |
| Magenta | 63% |
| Yellow | 62% |
| Black | 96% |

With the decrease in the intensity of the yellow LED in the blue/yellow illuminator, the optical contrast for the yellow ink has been further enhanced to 62%, with only a slight decrease in the contrasts of the cyan ink.

EXAMPLE 3

A similar spectral response may be obtained using a single "white LED" illuminator. White LEDs are commercially known and may be constructed from a blue LED that is coated with a phosphor that absorbs at short wavelengths and reemits at longer wavelengths, for example, in the green and red spectra. The 470 nm photons emitted from the blue LED excite fluorescence in the phosphor coating causing a broadband emission at wavelengths larger than about 500 nm. FIG. 9 shows the spectral output response for a known "white LED."

The amount of phosphors on a white LED determines the "warm" or "cold" nature of the white illumination. The warmer the color means that the illumination has generally a more red spectral component. By contrast, the colder the color means that the illumination has a more violet spectral component. The white LED corresponding to the spectral response in FIG. 9, for example, is considered "cold" due to the strong intensity light at about 470 nm.

According to one implementation, a particular white LED may be constructed having a phosphor that produces a spectrum that increases or optimizes the optical contrast of inks similar to the blue/yellow illuminators of Examples 1 and 2.

EXAMPLE 4

In another example, a plurality of LEDs each having the complementary color as the inks may be used. For CMYK inks, the complementary color for cyan is red; for magenta is green; and for yellow is blue.

Thus, for the CMYK color space, an illuminator having a red light source, a green light source and a blue light source may be used, and the different colored light sources may be switched on or off depending on the color of the ink to be measured. In one implementation, an illuminator having red, green, and blue LEDs may be constructed. Since, the reflectivity of black ink is almost zero across the visible spectrum, almost any color LED may be sufficient. Although, in some implementations, a white LED might also be provided for measuring black ink.

The relative contrasts for each of these inks on a piece of white paper using its complementary colored LED is shown in TABLE 4.

TABLE 4

| Ink Color | Contrast |
|---|---|
| Cyan | 95% |
| Magenta | 95% |
| Yellow | 96% |
| Black | 96% |

Selectively illuminating the ink using complementary colored light greatly improves the contrast for that ink.

Moreover, by selectively controlling the intensity of each of the red, green and blue light sources of an illuminator, light of other colors may be produced. For example, by selectively varying the intensity of each of the red, green, and blue light sources, a full gamut of colors may be generated.

EXAMPLE 5

Another illuminator may be constructed by combining a blue LED and white LED. By combining the blue and white LEDs and having independent control of the intensity of each of the LEDs, an increased or optimized illumination source for various colors of the spectrum can be achieved.

While the above examples and embodiments are directed to inks with reflectivity in the visible spectrum, it will be appreciated the embodiments disclosed herein, may be used with other spectrums, such as infrared (IR) or ultraviolet (UV). For example, it is known to print and image "invisible" or "transparent" marks which have a reflectivity in the IR spectra, for example, at 900 nm. The optical contrast for these marks may similarly be increased or optimized.

FIG. 10 shows a controller 200 that may be used in conjunction with a color sensing system 100 (FIG. 2), according to one embodiment. Input image data including ink color data may be input to the controller 200. The ink color data may be provided from the print controller (not shown) of in printing system. The controller 200 will analyze the ink color data, location, and selectively control the light sources and/or illuminators of the color sensing system 100. The output of controller 200 may generate or otherwise provide increased or optimized illuminator parameters which are transmitted to the color sensing system 100. These parameters may include control signals that may be used to selectively turn on and off completely and/or control the intensity of each source.

Advantageously, the color measurement may be dynamically controlled to enable fast response sensing (i.e. speeds up to 3 m/s) at high resolution (e.g., 600 dpi) to control the illumination of target images during color measurements. In some implementations, the controller may consider and weigh an increase in the contrast of one color ink versus possible decreases in contrast for others colors using the same illuminations. For example, with reference to the illuminator of Example 1, the increase in the contrast for yellow (from 42 to 54%) outweighs the decrease in contrast for cyan (from 73 to 68%) compared to the conventional fluorescent source The print controller sends both the input image data from the image, and the control information to the printheads. The print controller may include a raster image processor (RIP) that accepts an input Page Description, for example, as described by a page description language (PDL), such as Adobe® PostScript®, and produces a bitmap.

The bitmap may be passed to an image output terminal (IOT) interface of the printing system. The IOT interface may further perform image processing to make corrections or compensations to correct for deviations in the printing process. Grayscale image data is advantageously provided to the IOT interface because binary data cannot be easily image processed, without more complicated image processing to convert it back to something like grayscale.

While ink color data may be provided on a pixel-by-pixel basis from the input image data, illumination on a pixel-by-pixel basis may not always be feasible. Thus, the controller 200 may look at a group of pixels, for example, in the area of the input image data corresponding to the sensor reading area $W_A$ (FIG. 2) of the substrate to be illuminated to determine predominant colors therein. In one implementation, an averaging algorithm may be used.

The controller 200 may rely on look-up tables, rules, algorithms or other means to determine an increased or optimized illumination for ink colors according to the disclosed embodiments. The controller 200 may be dedicated hardware like ASICs or FPGAs, software, or a combination of dedicated hardware and software. For the different applications of the embodiments disclosed herein, the programming and/or configuration may vary.

Although the application is shown to be used in conjunction with a printing system, it will be appreciated that the methodology disclosed herein may be applied to any technology where optical contrast for color or spectral measurements can be advantageously improved or optimized.

While this invention has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A method for increasing the optical contrast for printed color relative to a background substrate comprising:
    providing an illuminator comprising at least one light source;
    determining a color to be printed; and
    selectively controlling the at least one light source to produce a spectral output that increases the optical contrast of printed color relative to the background substrate when measuring the printed color.

2. The method according to claim 1, wherein the at least one light source includes one or more of: a lamp, a bulb, a light emitting diode (LED), or a laser.

3. The method according to claim 1, wherein selectively controlling at least the one light sources includes switching the light source on and off completely, controlling the intensity of the at least one light source, or both.

4. The method according to claim 1, wherein the at least one light source includes a white light emitting diode (LED).

5. The method according to claim 1, wherein the at least one light source includes a blue light emitting diode (LED) and a white LED.

6. The method according to claim 1, wherein the at least one light source includes a blue light emitting diode (LED) and a yellow LED.

7. The method according to claim 1, wherein the at least one light source includes a red light emitting diode (LED), a green LED, and a blue LED.

8. The method according to claim 1, wherein color is measured using one of:
    a spectrophotometer, a colorimeter, a densitometer, a spectral camera, or a full width array (FWA) sensor.

9. The method according to claim 1, wherein the at least one light source is selected to match a color's absorbance.

10. The method according to claim 1, wherein the at least one light source is selected to be complementary to the color.

11. A system for increasing the optical contrast for printed color relative to a background comprising:
    an illuminator comprising at least one light source;
    a color measuring device; and
    a controller for selectively controlling the at least one light source so as produce a spectral output response that increases the optical contrast of the printed color relative to the background substrate when measured.

12. The system according to claim 11, wherein the at least one light source includes one or more of: a lamp, a bulb, a light emitting diode (LED), or a laser.

13. The system according to claim 11, wherein controller is configured to switch the at least one light source on and off completely, control the intensity of the light sources, or both.

14. The system according to claim 11, wherein the at least one light source includes a white light emitting diode (LED).

15. The system according to claim 11, wherein the at least one light source includes a blue light emitting diode (LED) and a white LED.

16. The system according to claim 11, wherein the at least one light source includes a blue light emitting diode (LED) and a yellow LED.

17. The system according to claim 11, wherein the at least one light source includes a red light emitting diode (LED), a green LED, and a blue LED.

18. The system according to claim 11, wherein color is measured using one of:
    a spectrophotometer, a colorimeter, a densitometer, a spectral camera, or a a full width array (FWA) sensor.

19. The system according to claim 11, wherein the at least one light source is selected to match a color's absorbance.

20. The system according to claim 11, wherein the at least one light source is selected to be complementary to the color.

21. A method for increasing the contrast for a spectral measurement relative to a background comprising:
    providing an illuminator comprising at least one light source; and
    selectively controlling the at least one light source to produce a spectral output that increases the optical contrast of each spectral measurement relative to the background when making the spectral measurement.

22. The method according to claim 21, wherein the spectral measurement is in the infrared (IR) or ultraviolet (UV) spectrum.

* * * * *